2

United States Patent Office 3,475,419
Patented Oct. 28, 1969

3,475,419
17 - HYDROXY - 3 - OXYESTRA - 1,3,5(10) - TRIENE-
17α-CARBOXALDEHYDES AND DERIVATIVES
Theodore C. Miller, East Greenbush, N.Y., assignor to
Sterling Drug Inc., New York, N.Y., a corporation of
Delaware
No Drawing. Filed Dec. 6, 1967, Ser. No. 688,318
Int. Cl. C07c 173/00, 169/10, 171/04
U.S. Cl. 260—239.55   4 Claims

ABSTRACT OF THE DISCLOSURE 17,17a - dioxygenated 3-oxy-D-homoestra-1,3,5(10)-tri-
enes, having estrogenic and hypocholesteremic activity,
are prepared by way of pyrolytic or Lewis acid rearrange-
ment of 17-hydroxy-3-oxy-estra-1,3,5(10)-triene-17α-car-
boxaldehydes.

This invention relates to new D-homo aromatic steroids,
and in particular is concerned with 17,17a-dioxygenated
3-oxy-D-homoestra-1,3,5(10)-trienes, with the method of
preparation thereof, and with intermediates in said prepa-
ration.

The 17,17a-dioxygenated 3-oxy-D-homoestra-1,3,5(10)-
trienes of the invention have the structural formula

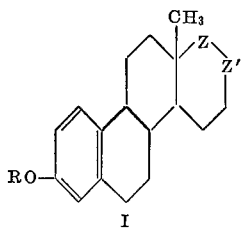

I wherein R is hydrogen, lower-alkyl or acyl; and Z and Z'
are C=O, CH(OH) and CH(O-acyl), acyl in each in-
stance being carboxylic acyl having from one to twelve
carbon atoms. Also included are lower-alkanone-cyclic
acetals of the above compounds wherein Z and Z' are
each CH(OH).

When R in the above Formula I stands for lower-alkyl,
the lower-alkyl group can have from one to six carbon
atoms, thus including, for example, such groups as methyl,
ethyl, propyl, isopropyl, butyl, hexyl, and the like.

The term acyl as used throughout stands for carboxylic
acyl having from one to twelve carbon atoms, preferably
having a molecular weight less than about 250 Represent-
ative of the carboxylic acyl radicals which can be present
are lower-alkanoyl, e.g., acetyl, propionyl, isobutyryl,
caproyl, heptanoyl, octanoyl, dodecanoyl, trimethylacetyl,
and the like; carboxy-lower-alkanoyl, e.g., hemisuccinyl,
hemiglutaryl, and the like; cycloalkyl-lower-alkanoyl
wherein cycloalkyl has 5–6 ring members, e.g., β-cyclo-
pentylpropionyl, β-cyclohexylpropionyl, and the like;
benzoyl; phenyl-lower-alkanoyl or -alkenoyl, e.g., phenyl-
acetyl, β-phenylpropionyl, cinnamoyl, and the like; phen-
oxy-lower-alkanoyl, e.g., p-chlorophenoxyacetyl; car-
bamyl, including unsubstituted carbamyl, N-lower-alkyl-
carbamyl and N,N-di-lower-alkylcarbamyl; and pyridyl-
carbonyl, e.g., nicotinoyl and isonicotinoyl. In acyl radi-
cals containing a phenyl group, the benzene ring thereof
can be unsubstituted or substituted by any number and
kind of substituents inert under the reaction conditions
used, including lower-alkyl, for example p-tolyl; lower-
alkoxy, for example 3,4-dimethoxyphenyl; halogen (in-
cluding fluorine, chlorine, bromine and iodine), for ex-
ample 2-bromophenyl; and nitro, for example p-nitro-
phenyl. The lower-alkyl and lower-alkoxy groups can
preferably have from one to four carbon atoms.

The lower-alkanone-cyclic acetals of compounds of
Formula I wherein Z and Z' are each CH(OH) are derived
from lower-alkanones having from three to about ten
carbon atoms, for example, acetone, methyl ethyl ketone,
dipropyl ketone, isopropyl methyl ketone, dibutyl ketone,
dipentyl ketone, and the like. The hydroxy groups at the
17 and 17a positions may have either the α- or β-configu-
ration, and in a given compound the configuration of the
hydroxy group at 17 and 17a can be the same or different.

The compounds of Formula I are prepared from 17-
hydroxy - 3 - RO - estra-1,3,5(10)-triene-17α-carboxalde-
hydes (II), wherein R has the meaning given hereinabove.
The process involves heating a 17-hydroxy-3-RO-estra-
1,3,5(10)-triene-17α-carboxaldehyde, or treating it with a
Lewis acid, which produces a compound of Formula I
wherein Z is CH(β—OH) and Z' is C=O (III):

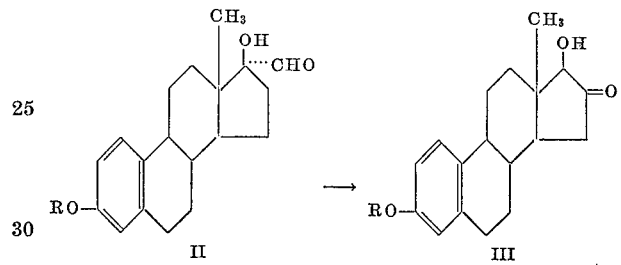

II                    III

When the reaction is carried out thermally the com-
pound of Formula II is heated above its melting point,
generally between about 100° and 250° C. When the
reaction is carried out in the presence of a Lewis acid the
rearrangement takes place under ambient conditions, that
is, the application of heat is not necessary.

A Lewis acid, as distinguished from a conventional pro-
tonic acid, is a molecule or ion that can combine with a
second molecule or ion by forming a covalent chemical
bond with two electrons from the second molecule or ion.
Examples of Lewis acids are certain metal or metalloid
halides or oxides, for instances, boron trifluoride, alumi-
num chloride, zinc chloride, silicon dioxide, and the like.

The compounds of Formula II can be subjected to con-
ventional oxidation, reduction or esterification reactions
to produce other compounds within the scope of Formula
I, as illustrated in the examples below.

The compounds of Formula I wherein Z and Z' are
both C=O are α,β-diketones and exist largely in the enol
form wherein there is a double bond in the 16,17-position
and hydroxy at C–17.

A lower-alkanone-cyclic acetal of a compound of
Formula I wherein Z and Z' are each CH(OH) is pre-
pared by reacting the latter with a lower-alkanone in the
presence of a strong acid catalyst; for example, a sulfonic
acid such as p-toluenesulfonic acid.

The intermediate 17-hydroxy-3-RO-estra-1,3,5(10)-
triene-17α-carboxaldehydes (II) are novel compounds
and also within the purview of the invention. They are in
turn prepared from the appropriate 17α-vinyl-17β-hy-
droxy-3-RO-estra-1,3,5(10)-trienes either by ozonolysis or
by osmium tetroxide oxidation followed by periodic acid
cleavage. The starting 17α-vinyl-17β-hydroxy-3-RO-estra-
1,3,5(10)-trienes are a known class of compounds (U.S.
Pat. 2,666,769) and can be prepared by partial hydrogena-
tion of the corresponding 17α-ethynyl compounds.

The 17 - hydroxy-3-RO-estra-1,3,5(10)-triene-17α-carboxaldehyde (II, R is hydrogen or lower-alkyl) can be further characterized by lithium aluminum hydride reduction to the corresponding 17 - hydroxy - 3 - RO - estra-1,3,5(10)-triene-17α-methanol which can be converted to its lower-alkanone-cyclic 17,20-acetal (IV):

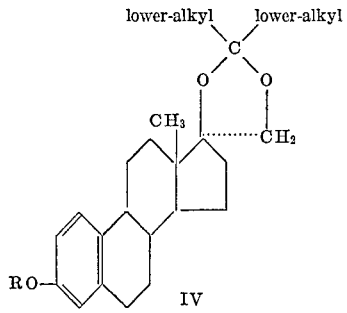

IV

The structures of the compounds of the invention were established by the modes of synthesis, by elementary analysis, and by ultraviolet, infrared and NMR spectra.

Endocrinological evaluation of the compounds of the invention having Formulas I, II and IV by standard methods has shown that they possess estrogenic and hypocholesteremic activity. The estrogenic activity was measured by the degree of stimulation of growth of the uterus of immature female rats upon subcutaneous or oral administrtation. The hypocholesteremic activity was assessed by blood serum cholesterol analysis [Turner et al., Scand. J. Clin. Lab. Investigation 9, 210 (1949)] of male rats receiving the test compounds by oral administration as compared with a group of control rats receiving no medication.

The actual determination of the numerical biological data definitive for a particular compound is readily obtained by standard test procedures by technicians having ordinary skill in pharmacological test procedures, without the need for any extensive experimentation. The compounds of the invention are effective in amounts of 1–100 mg. per dosage unit depending upon the compound used and the manner of administration. They are prepared for use by conventional pharmaceutical formulation procedures used to formulate other steroid hormones; that is, in capsule or tablet form with conventional excipients (for example, calcium carbonate, starch, lactose, talc, magnesium stearate, gum acacia, and the like) for oral administration; or as an aqueous or oil suspension in a pharmaceutically acceptable vehicle (aqueous alcohol, glycol, oil solution, or oil-water emulsion) for parenteral administration.

The following examples will further illustrate the invention without the latter being limited thereby.

EXAMPLE 1

17-hydroxy-3-methoxyestra-1,3,5(10)-triene-17α-carboxaldehyde [II; R is $CH_3$]

A stream of ozone (0.12 mole) was bubbled through a stirred solution of 3-methoxy-17α-vinylestra-1,3,5(10)-trien-17-ol (M.P. 107–109° C., 25.00 g., prepared from 3-methoxy-17α-ethynylestra-1,3,5(10)-trien-17-ol in yields of 75–85% by hydrogenation over palladium on strontium carbonate) in methylene dichloride (40 ml.) and pyridine (5 ml.), cooled by means of a solid carbon dioxide-acetone bath (−70° C.). The mixture, which contained a white precipitate, was flushed for about 10 minutes with oxygen. Triethylamine (5 ml.) was added and the cooling bath was removed. After one hour the red solution, which had warmed to 25° C., was washed with 2 N hydrochloric acid (800 ml.), then with 2.5% sodium bicarbonate solution (800 ml.). It was dried over sodium sulfate and concentrated on the steam-bath under water aspirator vacuum to a yellow oil which was diluted to 100 ml. with acetonitrile. One-fourth (25 ml.) of the solution was reconcentrated and the residue was recrystallized twice from acetone-hexane to give 2.79 g. of 17-hydroxy-3 - methoxyestra - 1,3,5(10)-triene-17α-carboxaldehyde, ivory microcrystals. The solid began to melt at about 110° C., gradually resolidified, and remelted at 179–183° C.; $[\alpha]_D^{25}=+57.1°$ (1% in chloroform).

In the estrogenic activity test, 17-hydroxy-3-methoxyestra-1,3,5(10)-triene-17α-carboxaldehyde was found to have $ED_{50}=40$ mg./kg./day upon oral administration and 9.0 mg./kg./day upon subcutaneous administration ($ED_{50}$=dose capable of producing 50% of maximum uterine growth calculated from an estrone standard dose-response curve).

In the hypocholesteremic activity test, 17-hydroxy-3-methoxyestra - 1,3,5(10) - triene - 17α - carboxaldehyde was found to have $ED_{33}=3.6$ mg./kg./day (dose capable of reducing the serum cholesterol content by 33%).

By replacing the 3-methoxy-17α-vinylestra-1,3,5(10)-trien-17-ol in the foregoing preparation by a molar equivalent amount of 3-hydroxy-17α-vinylestra-1,3,5(10)-trien-17-ol or 3-acetoxy-17α-vinylestra-1,3,5(10)-trien-17-ol, there can be obtained, respectively, 3,17-dihydroxyestra-1,3,5(10)-trien-17α-carboxaldehyde [II; R is H], or 3-acetoxy - 17 - hydroxyestra - 1,3,5(10) - trien - 17α-carboxaldehyde [II; R is $CH_3CO$].

EXAMPLE 2

(a) 17-hydroxy-3-methoxyestra-1,3,5(10)-triene-17α-methanol

A solution of 17-hydroxy-3-methoxyestra-1,3,5(10)-triene-17α-carboxaldehyde (prepared from 15.62 g. of 3-methoxy-17α-vinylestra-1,3,5(10)-trien-17-ol and 0.075 mole of ozone) in 150 ml. of tetrahydrofuran was added during 20 minutes to a solution of 3.79 of lithium aluminum hydride in 150 ml. of tetrahydrofuran held under nitrogen. The mixture was heated for one hour under reflux. Water (7.6 ml.) was added dropwise with stirring and the mixture was filtered with suction through kieselguhr. Concentration of the cloudy solution at 40–50° C. under water aspirator vacuum gave a yellow oil. A solution of the yellow oil in chloroform (about 30 ml.) was washed with 2 N hydrochloric acid (100 ml.), then with 2.5% sodium bicarbonate solution (100 ml.), dried over sodium sulfate, filtered, and concentrated to a yellow oil, which solidified. The solid was recrystallized twice from acetonitrile to give 9.27 g. of 17-hydroxy-3-methoxyestra-1,3,5(10)-triene-17α-methanol, colorless needles, M.P. 168–174° C. with an allotropic change in the middle of the range, $[\alpha]_D^{25}=+45°$ (1% in chloroform).

In the estrogenic activity test, 17-hydroxy-3-methoxyestra-1,3,5(10)-triene-17α-methanol was found to cause significant uterine growth at 1.0 mg./kg./day upon oral administration; and in the hypocholesteremic activity test, 17 - hydroxy - 3 - methoxyestra - 1,3,5(10) - triene - 17α-methanol was found to reduce the serum cholesterol level significantly at 128 mg./kg./day upon oral administration.

(b) 17-hydroxy-3-methoxyestra-1,3,5(10)-triene-17α-methanol 20-acetate

A solution of 1.00 g. of 17-hydroxy-3-methoxyestra-1,3,5(10)-triene-17α-methanol in pyridine (10 ml.) and acetic anhydride (10 ml.) was let stand for five hours at 25° C., then diluted with water (about 200 ml.). The resulting white solid was collected and dried: 1.13 g., M.P. 92–94° C. Recrystallization from acetonitrile gave 0.54 g. of 17 - hydroxy - 3 - methoxyestra - 1,3,5(10) - triene-17α-methanol 20 acetate in the form of colorless prisms of unchanged melting point; $[\alpha]_D^{25}=+29.7°$.

(c) 17 - hydroxy - 3 - methoxyestra - 1,3,5(10) - triene-17α-methanol cyclic 17,20-acetone acetal [IV; R is $CH_3$, lower-alkyl is $CH_3$]

A mixture of 17-hydroxy-3-methoxyestra-1,3,5(10)-triene-17α-methanol (3.16 g.), p-toluenesulfonic acid monohydrate (0.02 g.), and acetone (60 ml.) was stirred for two hours at 25° C. The steroid dissolved as the reaction proceeded. Water (about 600 ml.) and 5% sodium bicarbonate solution (10 ml.) were added. The resulting white solid (3.54 g., M.P. 96–97° C.) was recrystallized from acetonitrile to give 17-hydroxy-3-methoxyestra-1,3,5(10)-triene-17α-methanol cyclic 17,20-acetone acetal, colorless prisms, 2.78 g., M.P. 97–98° C.; $[\alpha]_D^{25}=+27.0°$ (1% in chloroform).

In the estrogenic activity test, 17-hydroxy-3-methoxyestra-1,3,5(10)-triene-17α-methanol cyclic 17,20-acetone acetal was found to have $ED_{50}=35.0$ mg./kg./day upon oraladministration; and in the hypocholesteremic activity test, $ED_{33}=24$ mg./kg./day.

By the procedure described above in Example 2, 3,17-dihydroxyestra - 1,3,5(10) - triene - 17α - carboxaldehyde can be reduced with lithium aluminum hydride to give 3,17 - dihydroxyestra - 1,3,5(10) - triene - 17α - methanol. The latter can be treated with acetone or dibutyl ketone in the presence of p-toluenesulfonic acid to give 3,17-dihydroxyestra-1,3,5(10)-triene-17α-methanol cyclic 17,20-acetone acetal [IV; R is H, lower-alkyl is $CH_3$] or cyclic 17,20-dibutyl ketone acetal [IV; R is H, lower-alkyl is $C_4H_9$].

EXAMPLE 3

17aβ-hydroxy-3-methoxy-D-homoestra-1,3,5(10)-trien-17-one [III; R is $CH_3$]

(a) With silica gel.—17 - hydroxy - 3 - methoxyestra-1,3,5(10)-triene-17α-carboxaldehyde (prepared from 3.12 g. of 3 - methoxy - 17α - vinylestra - 1,3,5(10) - trien-17-ol and 0.011 mole of ozone) was chromatographed on a column of silica gel (100 g.). The column was eluted with 80:20 pentane-ether, collecting 100 ml. fractions. Fractions 21–45 were combined (1.64 g.) and recrystallized from acetonitrile to give 17aβ-hydroxy-3-methoxy-D-homoestra-1,3,5(10)-trien-17-one as colorless prisms, M.P. 183–185° C.

(b) With boron trifluoride.—Boron trifluoride etherate (47%, 3.0 ml.) was added to a solution of 17-hydroxy-3-methoxyestra - 1,3,5(10) - triene - 17α - carboxaldehyde in acetonitrile (three-fourths, 75.0 ml., of the solution described in Example 1). The reaction was shown by thin layer chromatography to be complete after 10 minutes at 25° C. After 30 minutes the solution was quenched in water (about 1 liter). The resulting solid (18.41 g.) was recrystallized from acetonitrile to give 14.27 g. of 17aβ-hydroxy - 3 - methoxy - D - homoestra - 1,3,5(10) - trien-17-one, M.P. 172–180° C. Recrystallization of part (3.00 g.) of this material from ethyl acetate gave a different crystalline form (colorless needles), M.P. 183–185° C. with a phase change at about 175° C.; $[\alpha]_D^{25}=+10.5°$ (1% in chloroform).

(c) With heat.—17 - hydroxy - 3 - methoxyestra - 1,3,5(10)-triene-17α-carboxaldehyde (13.8 mg.) was heated from 100° C. to 200° C. over a period of 20 minutes. The residue was triturated with a drop of acetonitrile and dried to give 13.8 mg. of 17aβ-hydroxy-3-methoxy-D-homoestra-1,3,5(10)-trien-17-one, M.P. 174–180° C. It was identical with the product obtained by method (a) by mixture melting point, infrared spectral, and thin layer chromatographic comparisons.

In the estrogenic activity test, 17aβ-hydroxy-3-methoxy-D-homoestra-1,3,5(10)-trien-17-one was found to cause significant uterine growth at 10.0 mg./kg./day upon oral or subcutaneous administration; and in the hypocholesteremic activity test it had $ED_{33}=37$mg./kg./day.

By procedures similar to those described above in Example 3, 3,17-dihydroxyestra-1,3,5(10)-triene-17α-carboxaldehyde or 3-acetoxy-17-hydroxyestra-1,3,5(10)-triene-17α-carboxaldehyde can be rearranged to give 3,17aβ-dihydroxy-D-homoestra-1,3,5(10)-trien-17-one [III; R is H] or 3-acetoxy-17aβ-hydroxy-D-homoestra-1,3,5(10)-trien-17-one [III; R is $CH_3CO$].

EXAMPLE 4

17aβ-acetoxy-3-methoxy-D-homoestra-1,3,5(10)-triene-17-one [I; R is $CH_3$, Z is CH(β-OCOCH$_3$), Z' is C=O]

A pyridine (15 ml.) and acetic anhydride (15 ml.) solution of the residues from the mother liquors from the preparation of Example 3, part (b) was let stand for 17 hours at 25° C. The solution was partitioned between chloroform (25 ml.) and dilute hydrochloric acid (0.6 N, 300 ml.). The chloroform layer was washed with 2.5% sodium bicarbonate solution, dried over sodium sulfate, filtered, concentrated, and chromatographed on silica gel (210 g.). An unidentified colorless oil was eluted in fractions 1–11 (400 ml.-fractions) and 90:10 pentane-ether. Estrone methyl ether (0.70 g.) was eluted with 85:15 and 80:20 pentane-ether in fractions 12–25. Elution by 70:30 pentane-ether afforded 17aβ-acetoxy-3-methoxy-D-homoestra-1,3,5(10)-trien-17-one (2.12 g., M.P. 194–202° C.) in fractions 36–45. Recrystallization from acetonitrile gave thin colorless prisms, M.P. 202–204° C.; $[\alpha]_D^{25}=+22.7°$ (1% in chloroform).

In the estrogenic activity test, 17aβ-acetoxy-3-methoxy-D-homoestra-1,3,5(10)-trien-17-one was found to cause significant uterine growth at 100 mg./kg./day upon oral administration.

By replacing the acetic anhydride in the foregoing preparation by a molar equivalent amount of succinic anhydride, caproyl chloride, β-cyclohexylpropionyl chloride, p-nitrobenzoyl chloride, β-phenylpropionyl chloride, cinnamoyl chloride, p-chlorophenoxyacetyl chloride or nicotinoyl chloride, there can be obtained, respectively, 17aβ-(β-carboxypropionoxy) - 3 - methoxy - D - homoestra-1,3,5(10)-trien-17-one [I; R is $CH_3$, Z is $CH(β-OCOCH_2CH_2COOH)$ Z' is C=O]; 17aβ-caproyloxy-3-methoxy-D-homoestra-1,3,5(10)-trien-17-one [I; R is $CH_3$, Z is $CH(β-OCO(CH_2)_4CH_3)$ Z' is C=O]; 17aβ-(β-cyclohexylpropionoxy)-3-methoxy-D-homoestra-1,3,5(10)-trien-17-one [I; R is $CH_3$, Z is $CH(β-OCOCH_2CH_2C_6H_{11})$ Z' is C=O]; 17aβ-(p-nitrobenzoyloxy)-3-methoxy-D-homoestra-1,3,5(10)-trien-17-one [I; R is $CH_3$, Z is $CH(β-OCOC_6H_4NO_2-4)$ Z' is C=O]; 17aβ-(β-phenylpropionyloxy)-3-methoxy-D-homoestra-1,3,5(10)-trien-17-one [I; R is $CH_3$, Z is $CH(β-OCOCH_2CH_2C_6H_5)$ Z' is C=O]; 17aβ-cinnamoyloxy-3-methoxy-D-homoestra-1,3,5(10)-trien-17-one [I; R is $CH_3$, Z is $CH(β-OCOCH=CHC_6H_5)$ Z' is C=O]; 17aβ-(p-chlorophenoxyacetoxy)-3-methoxy-D-homoestra-1,3,5(10)-trien-17-one [I; R is $CH_3$, Z is $CH(β-OCOCH_2OC_6H_4Cl-4)$ Z' is C=O]; or 17aβ-nicotinoyloxy-3-methoxy-D-homoestra-1,3,5(10)-trien-17-one [I; R is $CH_3$, Z is $CH(β-OCOC_5H_4N)$ Z' is C=O].

EXAMPLE 5

3-methoxy-D-homoestra-1,3,5(10)-triene-17β,17aβ-diol [I; R is $CH_3$, Z and Z' are CH(β-OH)]

(a) By lithium aluminum hydride reduction.—A solution of 17aβ-hydroxy-3-methoxy-D-homoestra-1,3,5(10)-trien-17-one (6.29 g.) in tetrahydrofuran (65 ml.) was added dropwise with stirring to a solution of lithium aluminum hydride (1.52 g.) in tetrahydrofuran (65 ml.). After heating the mixture for four hours under reflux, water (2.5 ml.) was added. The mixture was filtered with suction through kieselguhr and the cloudy filtrate was concentrated at 40–50° C. under water aspirator vacuum to an oil. A chloroform solution (about 100 ml.) of the oil was washed with 2 N hydrochloric acid (100 ml.). The mixture was filtered through kieselguhr to remove insoluble aluminum salts. The chloroform layer was washed with 2.5% sodium bicarbonate solution (100 ml.), dried over sodium sulfate, filtered and concentrated with a large volume of ethyl acetate to about 100 ml. Dense colorless granules separated and two subsequent crops were collected. Recrystallization of the granules from chloroform-ethyl acetate gave 3.96 g. of 3-methoxy-D-homoestra-1,3,5(10) - trien - 17β,17aβ - diol, M.P. 187–191° C.; $[\alpha]_D^{25} = +82.3°$ (1% in chloroform).

(b) By sodium-isopropyl alcohol reduction.—Freshly cut sodium (9.2 g.) was added in small pieces at regular intervals over a period of two hours to a refluxing solution of 6.29 g. of 17aβ-hydroxy-3-methoxy-D-homoestra-1,3,5(10)-trien-17-one in 400 ml. of isopropyl alcohol held under nitrogen pressure. The mixture was cooled and quenched in 2 liters of ice-water containing 0.48 mole of hydrochloric acid. This mixture was extracted with chloroform and the chloroform extracts were washed with 5% sodium bicarbonate solution, dried over anhydrous sodium sulfate, filtered and concentrated. The residue was chromatographed on silica gel, the column eluted with 40:60 pentane-ether, and fractions of 400 ml. were cut. The material from fractions 18–25 was recrystallized from acetonitrile to give 3-methoxy-D-homoestra-1,3,5(10)-triene-17β,17aβ-diol, M.P. 181–187° C.

In the estrogenic activity test, 3-methoxy-D-homoestra-1,3,5(10)-triene-17β,17aβ-diol was found to cause significant uterine growth at 100 mg./kg./day upon oral administration; and in the hypocholesteremic test it had $ED_{33} = 20$ mg./kg./day.

EXAMPLE 6

17β,17aβ - diacetoxy - 3 - methoxy-D-homoestra-1,3,5(10)-triene [I; R is CH$_3$, Z and Z' are CH(β-OCOCH$_3$)] was prepared by acetylation of 3-methoxy-D-homoestra-1,3,5(10)-triene-17β,17aβ-diol (obtained by lithium aluminum hydride reduction of 4.95 g. of 17aβ-hydroxy-3-methoxy-D-homoestra-1,3,5(10)-trien-17-one with 25 ml. of acetic anhydride in 25 ml. of pyridine, 23 hours at 25° C. The reaction mixture was quenched in dilute hydrochloric acid, and the resulting solid was collected and chromatographed on 160 g. of silica gel. The desired product (3.88 g.) was eluted by 80:20 pentane-ether in fractions 16–29 (400 ml. fractions), and was recrystallized from acetonitrile to give 17β,17aβ-diacetoxy-3-methoxy-D-homoestra-1,3,5(10)-triene, colorless microscopic crystals, M.P. 159–161° C.; $[\alpha]_D^{25} = +44.9°$ (1% in chloroform).

In the estrogenic activity test, 17β,17aβ-diacetoxy-3-methoxy-D-homoestra-1,3,5(10)-triene was found to cause significant uterine growth at 100 mg./kg./day upon oral administration; and in the hypcholesteremic test it caused significant lowering of serum cholesterol at 64 mg./kg./day.

EXAMPLE 7

3-methoxy-D-homoestra-1,3,5(10)-triene-17β,17aβ-diol cyclic acetone acetal

A solution of 3-methoxy-D-homoestra-1,3,5(10)-triene-17β,17aβ-diol (1.53 g.), p-toluenesulfonic acid monohydrate (0.05 g.), and acetone (45 ml.) was stirred for 24 hours at 25° C. 2,2-dimethoxypropane (90%, 0.50 g.) was added and stirring was continued for six hours. The solid (1.65 g.) obtained by quenching the reaction solution in dilute sodium bicarbonate was collected and percolated through silica gel (100 g.) with 80:20 pentane-ether. Fractions of about 200 ml. were cut. The product (1.42 g., M.P. 141–143° C.) appeared in fractions 1–5 and was recrysatllized from acetonitrile to give 3-methoxy-D-homoestra-1,3,5(10)-triene-17β,17aβ-diol cyclic acetone acetal, colorless needles, M.P. 143–144° C.;

$$[\alpha]_D^{25} = -30.6°$$

(1% in chloroform).

In the estrogenic activity test, 3-methoxy-D-homoestra-1,3,5(10)-triene-17β,17aβ-diol cyclic acetone acetal was found to cause significant uterine growth at 100 mg./kg./day upon oral administration.

EXAMPLE 8

3-methoxy-D-homoestra-1,3,5(10)-triene-17α,17aβ-diol [I; R is CH$_3$, Z is CH(β-OH), Z' is CH(α-OH)]

(a) By sodium-isopropyl alcohol reduction.—The material from fractions 31–47 from the silica gel chromatogram in Example 5(b) was recrystallized from ethyl acetate to give 3-methoxy-D-homoestra-1,3,5(10)-triene-17α,17aβ-diol as colorless, microscopic crystals, M.P. 165–166° C.; $[\alpha]_D^{25} = +67.0°$ (1% in chloroform).

(b) By lithium aluminum hydride reduction.—A mixture of the residue (2.18 g.) obtained from the chloroform-ethyl acetate mother liquors of recrystallization in Example 5(a), acetone (40 ml.), and p-toluenesulfonic acid monohydrate (0.015 g) was stirred at 25° C. for 46 hours. The resulting solution was partitioned between 2.5% sodium bicarbonate solution (200 ml.) and chloroform (20 ml.). The aqueous phase was further extracted with chloroform (3× 5 ml.). The combined chloroform extracts were dried over sodium sulfate, filtered, concentrated, and chromatographed on silica gel (100 g.). Fractions of about 200 ml. were cut, and the column was eluted with 90:10 pentane-ether (fractions 1–45), 60:40 pentane-ether (fractions 46–53) and ether (fractions 54–65). The material from the ether fractions was recrystalized from ethyl acetate to give 3 - methoxy - D - homoestra-1,3,5(10)-triene-17α,17aβ-diol, M.P. 163–165° C.; $[\alpha]_D^{25} = +67.5°$ (1% in chloroform).

In the estrogenic activity test, 3-methoxy-D-homo-estra-1,3,5(10)-triene-17α,17aβ-diol was found to cause significant uterine growth at a dose level of 100 mg./kg./day upon oral administration; and in the hypo cholesteremic activity test it was found to cause significant lowering of the serum cholesterol content at 32 mg./kg.day.

EXAMPLE 9

17α,17aβ - diacetoxy - 3 - methoxy-D-homoestra-1,3,5(10)-triene [I; R is CH$_3$, Z is CH(β-OCOCH$_3$), Z' is CH(α-OCOCH$_3$)] was prepared by acetylation of 63.6 mg. of 3 - methoxy - D - homoestra-1,3,5(10)-triene-17α,17aβ-diol with 1 ml. of acetic anhydride in 1 ml. of pyridine. The product was recrystallized from acetonitrile to give 17α,17aβ-diacetoxy-3-methoxy-D-homoestra-1,3,5(10)-triene, M.P. 183–184.5° C.; $[\alpha]_D^{25} = +15.1°$ (1% in chloroform).

EXAMPLE 10

3-methoxy-D-homoestra-1,3,5(10-triene-17α,17aβ-diol cyclic acetone acetal

A mixture of 3-methoxy-D-homoestra-1,3,5(10)-triene-17α,17aβ-diol (0.32 g.), 2,2-dimethoxypropane (0.21 g.), p-toluenesulfonic acid monohydrate (0.01 g.), and acetone (6.0 ml.) was stirred at 25° C. for 24 hours. Since at this time solid still remained suspended, tetrahydrofuran (6.0 ml.) was added and stirring was continued for 24 hours longer. Molecular sieves (1.0 g.) were added and stirring was continued for 96 hours. Chloroform (about 6 ml.) was added to dissolve the organic portion of the precipitate and the mixture was stirred with sodium bicarbonate (0.42 g.) for two hours. It was filtered with suction through kieselguhr. After being concentrated to about 5.0 ml. the filtrate was streaked onto a 20 cm. x 40 cm. thicker layer chromatographic plate, which was developed with chloroform. The product (0.33 g., M.P. 191–193° C.) was extracted from the band which appeared at $R_F$ 0.20–0.49. It recrystallized from ethyl acetate to give 3-methoxy-D- homoestra-1,3,5(10)-triene-17α,17aβ-diol cyclic acetone acetal as colorless plates, M.P. 197–198° C.;

$$[\alpha]_D^{25} = +80.9°$$

(1% in chloroform).

EXAMPLE 11

17 - hydroxy - 3 - methoxy - D-homoestra-1,3,5(10),16-tetraen-17α-one [I; R is CH₃, Z and Z' are C=O, enol form]

A solution of t-butyl alcohol (100 ml.), potassium t-butoxide (4.49 g.) and one-fifth of the 17aβ-hydroxy-3-methoxy - D - homoestra-1,3,5(10)-trien-17-one, obtained from the ozonolysis of 3 - methoxy - 17α-vinylestra-1,3,5(10)-trien-17-ol (25.00 g.) followed by boron trifluoride rearrangement of the resulting crude aldehyde, was stirred for four hours at 25° C. It was quenched in water (0.6 liter) containing hydrochloric acid (0.060 mole) and the quench was extracted with chloroform (1× 30 ml., 2× 10 ml.). The combined chloroform extracts were washed with 2.5% sodium bicarbonate solution, dried over sodium sulfate, filtered and concentrated. The residue was chromatographed on silica gel (160 g.). Fractions of about 400 ml. were cut. The product (1.94 g., M.P. 173–175° C.) was eluted in fractions 4–15 by 80:20 pentane-ether and crystallized from acetonitrile to give 17 - hydroxy - 3-methoxy - D - homoestra-1,3,5(10),16-tetraen-17a-one as colorless blades, M.P. 176–177° C.; $[\alpha]_D^{25} = +34.3°$ (1% in chloroform).

In the estrogenic activity test, 17-hydroxy-3-methoxy-D-homoestra - 1,3,5(10),16 - tetraen-17a-one was found to cause significant uterine growth at a dose level of 100 mg./kg./day upon oral administration; and in the hypochloesteremic activity test it had $ED_{33} = 32$ mg./kg./day.

I claim:
1. 17 - hydroxy - 3-RO-estra-1,3,5(10)-triene-17α-carboxaldehyde, wherein R is hydrogen, lower-alkyl, or carboxylic acyl having from one to twelve carbon atoms.
2. 17 - hydroxy - 3-methoxyestra-1,3,5(10)-triene-17α-carboxaldehyde, according to claim 1 wherein R is methyl.
3. A lower-alkanone-cyclic 17,20-acetal of 17-hydroxy-3-RO-estra-1,3,5(10)-triene-17α-methanol, wherein R is hydrogen or lower-alkyl.
4. 17 - hydroxy - 3-methoxyestra-1,3,5(10)-triene-17α-methanol acetone cyclic 17,20-acetal, according to claim 3 wherein the lower-alkanone is acetone and R is methyl.

References Cited
UNITED STATES PATENTS 3,364,207   1/1968   Brown.

HENRY A. FRENCH, Primary Examiner

U.S. Cl. X.R.

260—239.5, 340.9, 397.4, 488, 590, 618, 619, 999

UNITED STATES PATENT OFFICE
CERTIFICATE OF CORRECTION

Patent No. 3,475,419      Dated October 28, 1969

Inventor(s) Theodore C. Miller

It is certified that error appears in the above-identified patent and that said Letters Patent are hereby corrected as shown below:

Column 2, lines 21-31, in formula III

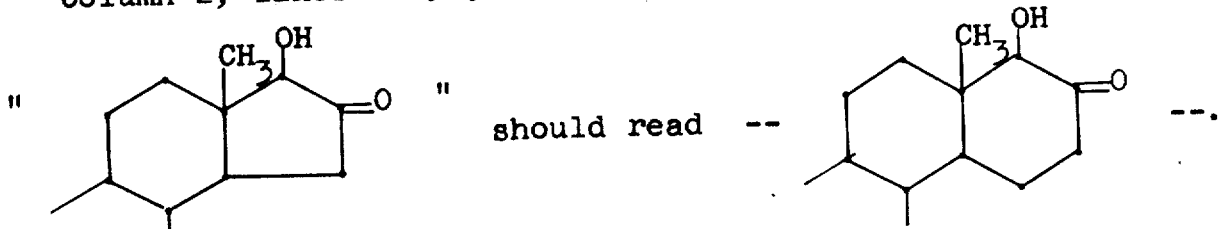

Column 2, line 45, "II" should read --III--.
Column 6, line 8, "0.6" should read --0.67--; line 13, "and 90:10" should read --with 90:10--.
Column 7, line 42, "-one" should read -- -one)--; line 56, "hypcholesteremic" should read --hypocholesteremic--.
Column 8, line 71, "thicker" should read --thick--.
Column 9, line 10, "-17α-one" should read -- -17a-one--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents